No. 848,146. PATENTED MAR. 26, 1907.
J. L. WILLIAMS.
END GATE.
APPLICATION FILED SEPT. 18, 1906.
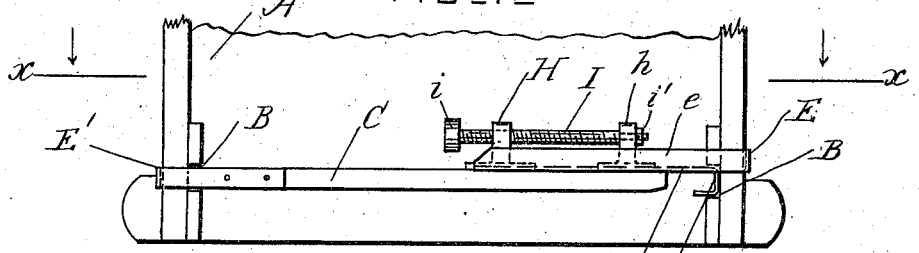
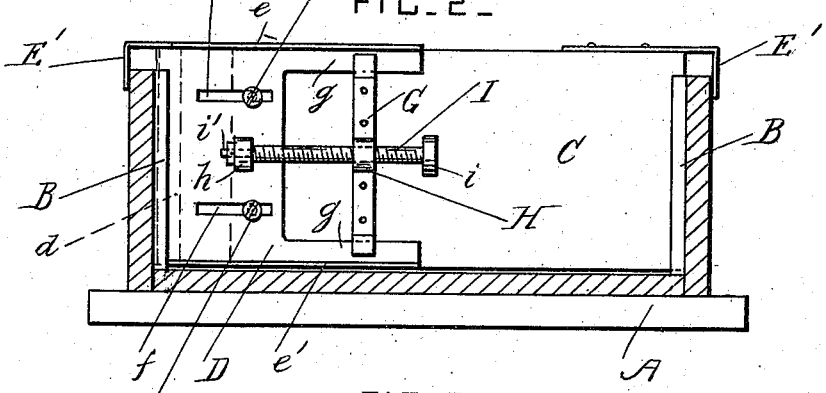
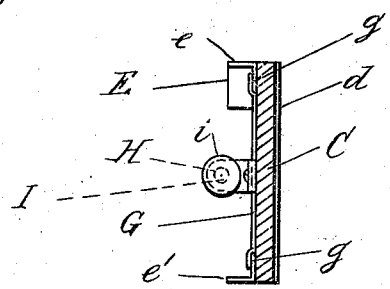
WITNESSES:
S. E. Tomlinson
Walter Allen
INVENTOR
James L. Williams
BY
Herbert W. Jenner
Attorney

UNITED STATES PATENT OFFICE.

JAMES L. WILLIAMS, OF MOUNT HAMIL, IOWA.

END-GATE.

No. 848,146.　　　Specification of Letters Patent.　　　Patented March 26, 1907.

Application filed September 18, 1906. Serial No. 335,154.

*To all whom it may concern:*

Be it known that I, JAMES L. WILLIAMS, a citizen of the United States, residing at Mount Hamil, in the county of Lee and State of Iowa, have invented certain new and useful Improvements in End-Gates; and I do hereby declare the following to be a full, clear, and exact description of the invention, such as will enable others skilled in the art to which it appertains to make and use the same.

This invention relates to end-gates for wagons; and it consists in the novel construction and combination of the parts hereinafter fully described and claimed.

In the drawings, Figure 1 is a partial plan view of a wagon-body provided with an end-gate according to this invention. Fig. 2 is a cross-section taken on the line $x\,x$ in Fig. 1 and looking in the direction of the arrows. Fig. 3 is a cross-section through the end-gate.

A is a portion of the body of a wagon of any approved construction, and B are grooved guides or guides forming grooves near its open end.

C is the end-gate, which is slidable vertically in the said guides. The main portion of this end-gate is provided with a slidable plate D, which has a channel-shaped end portion $d$, arranged beyond the end of the main portion of the end-gate and forming an extension of it. One end of the end-gate slides in one guide-groove, and the portion $d$ slides in the other guide-groove.

Each end of the end-gate is provided with hooks E and E', respectively, and the hook E preferably consists of an extension of a flange $e$, formed on the upper edge of the extension-plate D. The lower edge of the extension-plate is also provided with a flange $e'$ to stiffen it.

The extension-plate D is provided with slots $f$, and F are guide-pins secured to the main portion of the end-gate for the said slots to slide over. G is a guide-bar also secured to the main portion of the end-gate and engaging with projections $g$ on the said body portion. H is a nut secured to the said body portion of the end-gate, and $h$ is an arm which projects from the extension-plate. I is a screw which engages with the said nut. This screw has a knob $i$ for revolving it, and its end portion $i'$ is operatively connected with the said arm, so that when the screw is revolved the extension-plate is slid back and forth.

The hooks project over the wagon sides and prevent the said sides from spreading. The screw permits the extension-plate to be regulated so that the end-gate will engage with the guide-grooves of the wagon-body to the best possible advantage.

The extension-plate may be set so as to hold the end-gate stationary in the guide-grooves in any desired position or it may be set so as to permit the end-gate to be slid up or down with any desired freedom.

This end-gate is specially intended for use in connection with an end-gate seeder of approved construction.

What I claim is—

1. The combination, with the main portion of an end-gate, and an extension-plate arranged at one end thereof, of a nut secured to one of the said parts, a revoluble screw engaging with the said nut and operatively connected with the other said part, and a wagon-body provided with guide-grooves in which the said end-gate is normally slidable, said screw affording a means for clamping the end-gate after its vertical position has been adjusted.

2. The combination, with a wagon-body provided with guide-grooves, of an end-gate provided with an extension-plate having a channel-shaped end portion, and means for adjusting the position of the said plate longitudinally of the body portion of the said end-gate.

3. The combination, with a wagon-body provided with guide-grooves, of an end-gate provided with an extension-plate and slidable in the said grooves, said extension-plate having a channel-shaped portion at one end, longitudinal projections at its other end, guideslots in its middle part, and flanges at its top and bottom; a guide-bar secured to the body portion of the end-gate and engaging with the said projections, guide-pins also secured to the said body portion and engaging with the said slots, a nut secured to the said body portion, an arm secured to the said plate, and an adjusting-screw engaging with the said nut and operatively connected with the said arm.

In testimony whereof I have affixed my signature in the presence of two witnesses.

JAMES L. WILLIAMS.

Witnesses:
W. J. WILLIAMSON,
WM. WILLIAMSON.